(12) United States Patent
Nakagawa (10) Patent No.: US 8,756,235 B2
(45) Date of Patent: Jun. 17, 2014

(54) INFORMATION PROCESSOR, METHOD, AND PROGRAM

(75) Inventor: Masao Nakagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1084 days.

(21) Appl. No.: 11/907,555

(22) Filed: Oct. 15, 2007

(65) Prior Publication Data

US 2008/0133452 A1 Jun. 5, 2008

(30) Foreign Application Priority Data

Oct. 25, 2006 (JP) ................................. 2006-289388

(51) Int. Cl.
*G06F 17/30* (2006.01)
*G06F 7/00* (2006.01)

(52) U.S. Cl.
USPC ........................................................ 707/741

(58) Field of Classification Search
USPC .................................. 707/736, 737, 738, 741
See application file for complete search history.

(56) References Cited

U.S. PATENT DOCUMENTS

| | | | |
|---|---|---|---|
| 6,751,613 B1 * | 6/2004 | Lee et al. ................................ | 1/1 |
| 7,813,557 B1 * | 10/2010 | Bourdev ........................ | 382/205 |
| 2004/0213553 A1 * | 10/2004 | Nagahashi ....................... | 386/69 |
| 2006/0020624 A1 * | 1/2006 | Svendsen et al. .......... | 707/103 R |
| 2006/0167942 A1 * | 7/2006 | Lucas et al. ................. | 707/104.1 |
| 2006/0242178 A1 * | 10/2006 | Butterfield et al. ............ | 707/100 |
| 2007/0067295 A1 * | 3/2007 | Parulski et al. ..................... | 707/7 |
| 2007/0078832 A1 * | 4/2007 | Ott et al. ............................. | 707/3 |
| 2007/0112838 A1 * | 5/2007 | Bjarnestam et al. .......... | 707/102 |
| 2007/0118508 A1 * | 5/2007 | Svendsen ........................... | 707/3 |
| 2007/0118509 A1 * | 5/2007 | Svendsen ........................... | 707/3 |
| 2007/0174247 A1 * | 7/2007 | Xu et al. ............................. | 707/3 |
| 2007/0299806 A1 * | 12/2007 | Bardsley et al. ................... | 707/1 |
| 2008/0040301 A1 * | 2/2008 | Sadagopan et al. .............. | 706/16 |
| 2008/0082486 A1 * | 4/2008 | Lermant et al. .................... | 707/3 |
| 2008/0091549 A1 * | 4/2008 | Chang et al. ..................... | 705/26 |
| 2008/0114778 A1 * | 5/2008 | Siegel ........................... | 707/100 |
| 2008/0235275 A1 * | 9/2008 | Tanaka et al. .............. | 707/104.1 |
| 2010/0198835 A1 * | 8/2010 | Sorvari et al. ................. | 707/748 |

FOREIGN PATENT DOCUMENTS

| | | |
|---|---|---|
| JP | 01-269172 | 10/1989 |
| JP | 02-253374 | 10/1990 |
| JP | 2002-202986 | 7/2002 |

OTHER PUBLICATIONS

Korean Office Action issued Nov. 27, 2013 for corresponding Korean Application No. 10-2007-0104448.

* cited by examiner

*Primary Examiner* — Jeffrey A Burke
(74) *Attorney, Agent, or Firm* — Rader, Fishman & Grauer PLLC

(57) ABSTRACT

An information processor includes: extraction means for extracting metadata from contents; first storage means for storing a candidate metadata list in which candidate metadata becoming candidates for typical metadata having higher extraction frequencies out of the extracted metadata and a first frequency at which the candidate metadata were extracted are interrelatedly stored; first updating means for adding the extracted metadata as the candidate metadata to the candidate metadata list, thus updating the candidate metadata list; second storage means for storing a typical metadata list in which the typical metadata and a second frequency at which the typical metadata were extracted are interrelatedly stored; and second updating means which, when the first frequency stored in the candidate metadata list is in excess of a given frequency, adds the candidate metadata associated with the first frequency as the typical metadata to the typical metadata list, thus updating the typical metadata list.

15 Claims, 9 Drawing Sheets

| CANDIDATE METADATA | FREQUENCY (NUMBER OF TIMES) |
| --- | --- |
| RAMEN | 7 |
| EXHIBITION OF FIREWORKS | 4 |
| BACK TO HOME TOWN | 9 |
| BARBECUE | 5 |
| EXHIBITION | 7 |
| WALKING | 2 |
| AT BEACHSIDE | 1 |
| CHRISTMAS | 9 |
| BLOG | 3 |
| ⋮ | ⋮ |

FIG. 6

| TYPICAL METADATA | FREQUENCY (NUMBER OF TIMES) |
| --- | --- |
| WEDDING CEREMONY | 15 |
| FRIENDS | 22 |
| JOURNEY | 14 |
| WITH FAMILY | 10 |
| PHOTOS OF GROUPS | 11 |
| SEAS | 17 |
| PLEASANT | 16 |
| ⋮ | ⋮ |

| TYPICAL METADATA | FREQUENCY (NUMBER OF TIMES) | EVALUATION VALUE (SCORE) | DATE OF UPDATE |
|---|---|---|---|
| WEDDING CEREMONY | 15 | 0 | 1 YEAR BEFORE |
| FRIENDS | 22 | 9 | 200 DAYS BEFORE |
| JOURNEY | 14 | 10 | 100 DAYS BEFORE |
| WITH FAMILY | 10 | 4 | 200 DAYS BEFORE |
| PHOTOS OF GROUPS | 11 | 8 | 100 DAYS BEFORE |
| SEAS | 17 | 12 | 100 DAYS BEFORE |
| PLEASANT | 16 | 0 | 1 YEAR BEFORE |
| BACK TO HOME TOWN | 10 | 10 | TODAY |
| ⋮ | ⋮ | ⋮ | ⋮ |

FIG. 12

| CANDIDATE METADATA | FREQUENCY (NUMBER OF TIMES) | EVALUATION VALUE (SCORE) | DATE OF UPDATE |
|---|---|---|---|
| RAMEN | 7 | 5 | 100 DAYS BEFORE |
| EXHIBITION OF FIREWORKS | 5 | 5 | TODAY |
| BARBECUE | 5 | 0 | 1 YEAR BEFORE |
| EXHIBITION | 7 | 3 | 200 DAYS BEFORE |
| WALKING | 2 | 0 | 1 YEAR BEFORE |
| AT BEACHSIDE | 1 | 0 | 200 DAYS BEFORE |
| CHRISTMAS | 9 | 7 | 100 DAYS BEFORE |
| BLOG | 3 | 0 | 1 YEAR BEFORE |
| WITH FRIENDS | 1 | 1 | TODAY |
| ⋮ | ⋮ | ⋮ | ⋮ |

INFORMATION PROCESSOR, METHOD, AND PROGRAM

CROSS REFERENCES TO RELATED APPLICATIONS

The present invention contains subject matter related to Japanese Patent Application JP 2006-289388, filed in the Japanese Patent Office on Oct. 25, 2006, the entire contents of which are incorporated herein by reference.

BACKGROUND OF THE INVENTION

1. Field of the Invention

The present invention relates to information processor, method, program, and more particularly to the information processor, method, and program capable of creating a list in which useful metadata are stored.

2. Description of the Related Art

In recent years, digital still cameras (DSCs) have become widespread. Furthermore, recording media, such as memory cards for recording images captured by digital still cameras, have tended to have increasing capacities.

As the capacity of each recording medium increases, the number of frames of DSC images capable of being recorded in the recording medium increases. Consequently, it has become more difficult for the user to search stored DSC images for desired ones and to view them.

Because a digital still camera (DSC) can store a large number of DSC images, DSC images offered from other digital still cameras by communication means, such as wireless communications or via a detachable recording medium, can also be stored. This further increases the number of DSC images recorded in the former camera itself. Consequently, it becomes more difficult for the user to search for desired DSC images quickly.

Accordingly, a digital still camera permitting one to easily search for desired DSC images is available. In particular, after a subject is photographed, keywords (metadata) associated with the taken photographs are entered. When the user searches for desired DSC images, the search is done under conditions using the added metadata. This permits the desired DSC images to be searched easily. That is, metadata associated with DSC images are managed by a list of metadata in this digital still camera.

One proposed technique of managing metadata is described, for example, in JP-A-2002-202986 (patent reference 1). Specifically, a database made up of plural metadata labels is built, based on replies from the user to plural inquiries. The metadata labels are assigned to the images.

SUMMARY OF THE INVENTION

However, the technique proposed in the above-cited patent reference 1 is configured so that the metadata database to be given to images is offered from plural databases previously prepared based on replies to inquiries made to users. The offered databases do not always contain metabase labels that the user wants to use. Furthermore, with this technique, a database has been previously established so vogue words and new words, for example, which reflected the age, which did not exist when the database was established, may not be used as metadata labels.

That is, useful metadata were not stored in the metadata list. Therefore, it may not be possible to offer useful metadata to the user.

Thus, it is desirable to be able to create a metadata list in which useful metadata are stored.

An information processor according to one embodiment of the present invention has: extraction means for extracting metadata from contents; first storage means for storing a candidate metadata list in which candidate metadata becoming candidates for typical metadata having higher extraction frequencies out of the extracted metadata, and a first frequency at which the candidate metadata were extracted are interrelatedly stored; first updating means for adding the extracted metadata as the candidate metadata to the candidate metadata list, thus updating the list; second storage means for storing a typical metadata list in which the typical metadata and a second frequency at which the typical metadata were extracted are interrelatedly stored; and second updating means which, when the first frequency stored in the candidate metadata list is in excess of a given frequency, adds the candidate metadata associated with the first frequency as the typical metadata to the typical metadata list, thus updating the list.

It is possible to add display control means for arranging the typical metadata stored in the typical metadata list in order of decreasing the second frequency and displaying the arranged typical metadata.

It is possible to add: calculational means for calculating evaluation values based on the second frequency associated with the typical metadata stored in the typical metadata list; and display control means for arranging the typical metadata in order of decreasing the calculated evaluation value.

The calculational means can calculate the evaluation values by weighing the second frequency according to a date of update in which the typical metadata were added to the typical metadata list.

The user can configure the extracted metadata such that the data is information attached to the contents.

The contents can be configured so that the contents are images taken by cameras.

An information processing method in accordance with one embodiment of the present invention includes the steps of: extracting metadata from contents; adding the extracted metadata as candidate metadata becoming candidates for typical metadata extracted at high frequencies to a candidate metadata list in which the candidate metadata and a first frequency at which the candidate metadata were extracted are interrelatedly stored, thus updating the candidate metadata list; and adding the candidate metadata associated with the first frequency as the typical metadata to a typical metadata list in which the typical metadata and a second frequency at which the typical metadata were extracted are interrelatedly stored, provided that the first frequency stored in the candidate metadata list is in excess of a given frequency, thus updating the typical metadata list.

A program according to one embodiment of the present invention includes the steps of: extracting metadata from contents; adding the extracted metadata as candidate metadata, becoming candidates for typical metadata extracted at high frequencies to a candidate metadata list where the candidate metadata and a first frequency at which the candidate metadata were extracted are interrelatedly stored, thus updating the candidate metadata list; adding the candidate metadata associated with the first frequency as the typical metadata to a typical metadata list in which the typical metadata, and a second frequency at which the typical metadata were extracted are interrelatedly stored provided that the first frequency stored, in the candidate metadata list is in excess of a given frequency, thus updating the typical metadata list.

According to one embodiment of the present invention, metadata are extracted from contents. The extracted metadata are added as candidate metadata, becoming candidates for typical metadata extracted at high frequencies to a candidate metadata list in which candidate metadata and the first frequency at which the candidate metadata were extracted are interrelatedly stored, thus updating the list. Where the first frequency stored in the candidate metadata list is in excess of a given frequency, the candidate metadata associated with the first frequency is added as typical metadata to a typical metadata list in which the typical metadata and a second frequency, at which the typical metadata were extracted, are interrelatedly stored, thus updating the list.

As described so far, according to the embodiments of the present invention, it is possible to create a metadata list in which useful metadata are stored.

DESCRIPTION OF THE PREFERRED EMBODIMENTS

Embodiments of the present invention are hereinafter described. The relationships between the constituent components of the present invention and the embodiments described in the specification or shown in the drawings are as follows. The description is intended to confirm that embodiments supporting the present invention are described in the specification or drawings. Accordingly, if there is any embodiment that is not described herein as an embodiment which is described in the specification or drawings and corresponds to constituent components of the present invention, it does not mean that the embodiment fails to correspond to the constituent components. Conversely, if there is any embodiment described herein as one corresponding to the constituent components, it does not mean that the embodiment fails to correspond to constituent components other than those constituent components.

An information processor (for example, digital still camera 1 of FIG. 3) according one embodiment of the present invention has: extraction means (e.g., metadata extraction portion 54 of FIG. 3) for extracting metadata from contents; first storage means (e.g., candidate metadata list storage portion 56 of FIG. 3) for storing a list of candidate metadata (e.g., candidate metadata list 56a of FIG. 3), in which candidate metadata becoming candidates for typical metadata extracted at higher frequencies out of the extracted metadata and a first frequency at which the candidate metadata were extracted are interrelatedly stored; first updating means (e.g., candidate metadata list-updating portion 55 of FIG. 3) for adding the extracted metadata as the candidate metadata to the candidate metadata list and updating the list; second storage means (e.g., typical metadata list storage portion 58 of FIG. 3) for storing a list of typical metadata (e.g., typical metadata list 58a of FIG. 3) in which the typical metadata and a second frequency at which the typical metadata were extracted are interrelatedly stored; and second updating means (e.g., typical metadata list-updating portion 57 of FIG. 3) for adding the candidate metadata associated with the first frequency as the typical metadata to the typical metadata list and updating the list in a case where the first frequency stored in the candidate metadata list is in excess of a given frequency.

It is possible to add display control means (e.g., display control portion 59 of FIG. 3) for arranging the items of the typical metadata stored in the typical metadata list (e.g., typical metadata list 58a of FIG. 3) in order of decreasing the second frequency and displaying the metadata.

It is possible to add: calculational means (e.g., evaluation value calculation portion 111 of FIG. 9) for calculating an evaluation value based on the second frequency associated with the typical metadata stored in the typical metadata list (e.g., typical metadata list 58a of FIG. 9); and display control means (e.g., display control portion 59 of FIG. 9) for arranging the items of the typical metadata in order of decreasing the calculated evaluation value and displaying the typical metadata.

Figure 10:
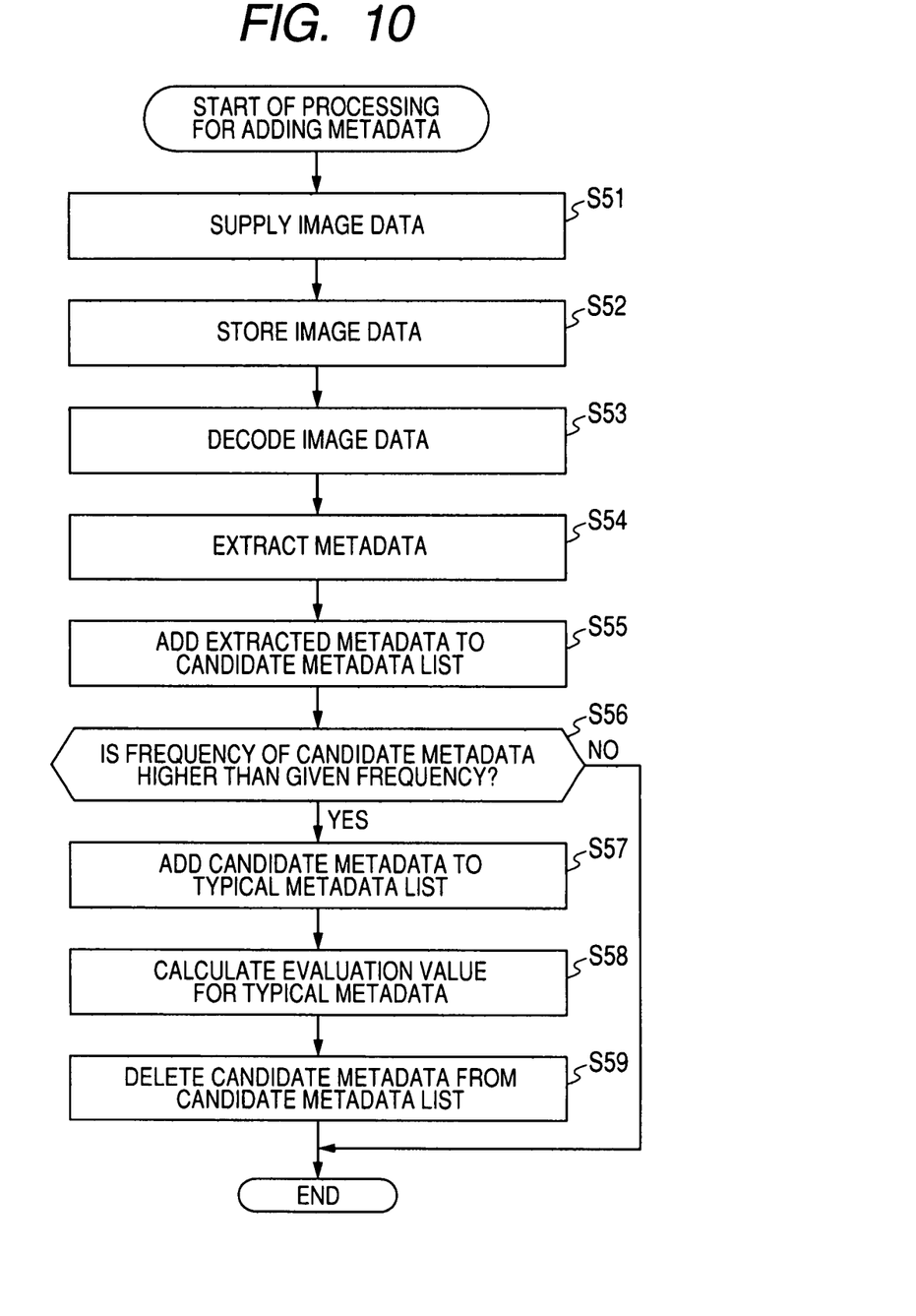
FIG. 10 is a flowchart illustrating processing performed by the digital still camera of FIG. 9 to add metadata.

The calculational means can calculate the evaluation value by weighting the second frequency according to a date of update on which the typical metadata were added to the typical metadata list (e.g., the processing of step S58 of FIG. 10).

The user can configure the extracted metadata such that the metadata is information attached to the contents.

The contents can be so configured that the contents are images taken by cameras.

Figure 4:
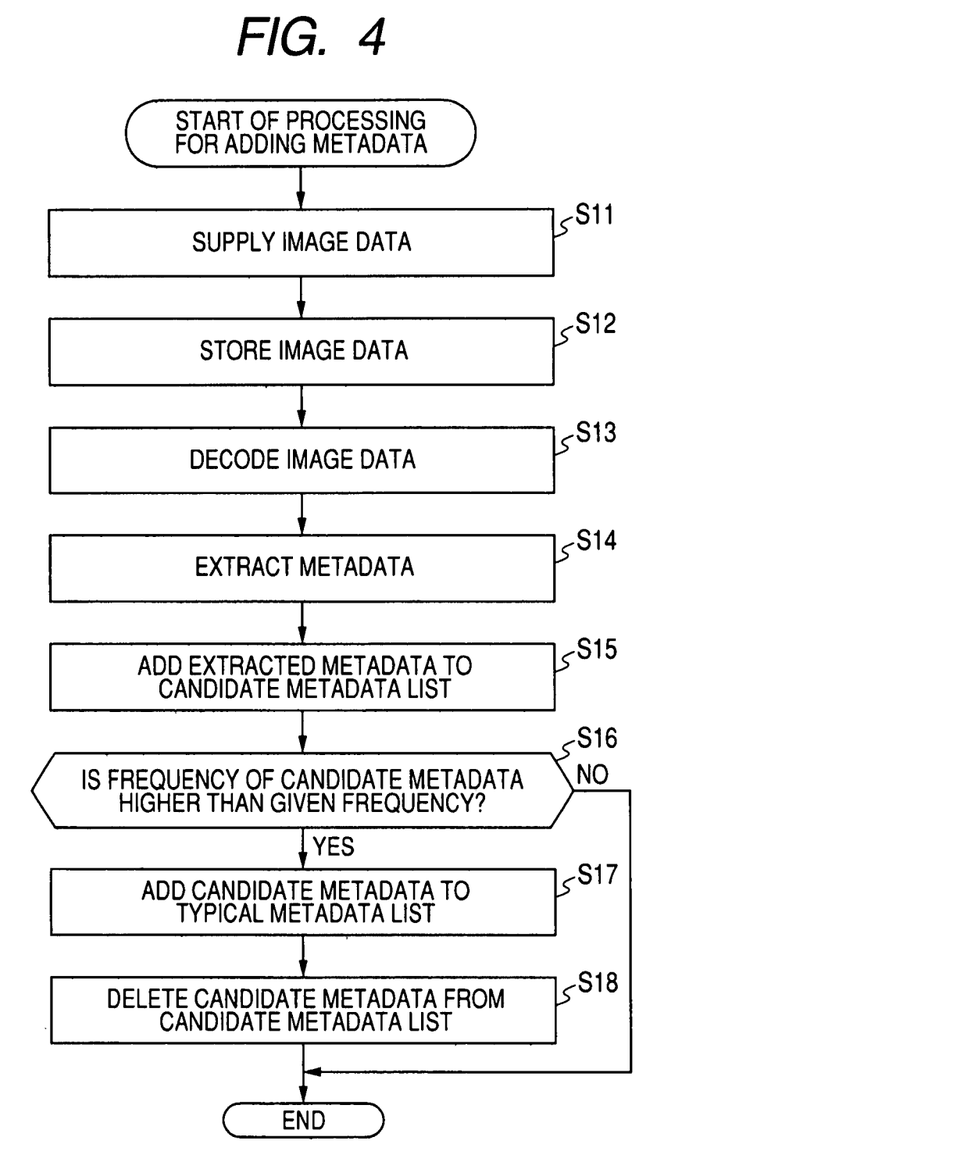
FIG. 4 is a flowchart illustrating processing performed by the digital still camera of FIG. 3 to add metadata.

An information processing method or program according to one embodiment of the present invention includes the steps of: extracting metadata from contents (e.g., processing of step S14 of FIG. 4); adding the extracted metadata as candidate metadata becoming candidates for typical metadata extracted at high frequencies to a candidate metadata list in which the candidate metadata and a first frequency at which the candidate metadata were extracted are interrelatedly stored, thus updating the candidate metadata list (e.g., processing of step S15 of FIG. 4); and adding the candidate metadata associated with the first frequency as the typical metadata to a typical metadata list in which the typical metadata and a second frequency at which the typical metadata were extracted are interrelatedly stored provided that the first frequency stored in the candidate metadata list is in excess of a given frequency, thus updating the typical metadata list (e.g., processing of step S17 of FIG. 4).

Embodiments of the present invention are hereinafter described with reference to the drawings.

Figure 1:
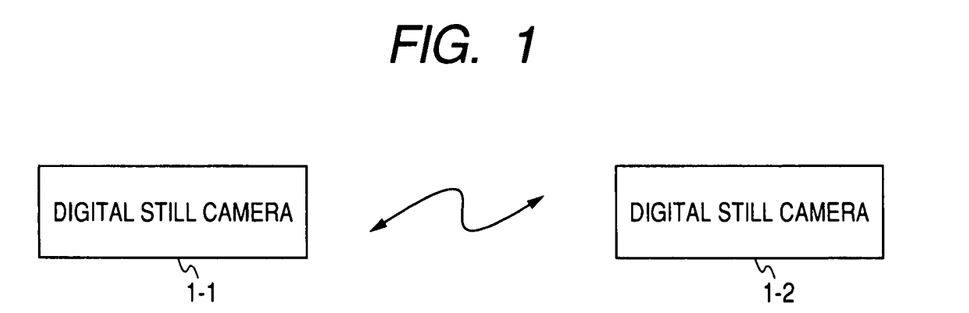
FIG. 1 is a diagram illustrating transmission and reception of images captured by a digital still camera (DSC) in accordance with one embodiment of the present invention.

FIG. 1 is a diagram illustrating transmission and reception of images taken by a digital still camera in accordance with one embodiment of the present invention.

A digital still camera 1-1 takes pictures of a subject in response to user's manipulations and stores the taken images of the subject. Another digital still camera 1-2 takes pictures of a subject and stores the taken images in the same way as the digital still camera 1-1.

The digital still cameras 1-1 and 1-2 attach metadata about which instructions are given from the user to DSC (digital still camera) images stored by himself or herself. That is, after the user takes images of a subject, keywords associated with the images are entered. Thus, the keywords (metadata) are attached to the DSC images. Therefore, when the DSC images are searched, for example, it is possible to search for desired DSC images using the metadata attached to the DSC images as conditions. In other words, it can also be said that the metadata attached to the DSC images by the user is information for classifying the DSC images.

Each of the digital still cameras 1-1 and 1-2 has a communication portion (communication portion 24 of FIG. 2 as described later) for communicating with other devices. The cameras 1-1 and 1-2 can communicate with each other, for example, wirelessly. Thus, the cameras 1-1 and 1-2 can send DSC images stored in each camera to the other camera or receive DSC images sent in from the other camera and store them in the present camera.

For example, the digital still camera 1-1 receives DSC images sent in from the digital still camera 1-2 and stores them. At this time, in the camera 1-1, DSC images taken by the two different cameras 1-1 and 1-2 are stored. Keywords (metadata) entered by different users are attached to the DSC images taken by the two different cameras.

For example, a first user using the digital still camera 1-1 attaches metadata items (e.g., "wedding ceremony", "seas", or "pleasant") to the DSC images. For example, a second user using the digital still camera 1-2 attaches metadata items (e.g., "exhibition of fireworks", "back to home town", or "with friends") to DSC images.

That is, the metadata items attached to the DSC images have been attached by the two different persons, i.e., first and second users. Therefore, there is the possibility that manifestation of the characteristics of the users creates a large number of metadata items which are not coincident in content and whose number is in proportion to the number of DSC images.

For example, the digital still camera 1-1 acquires metadata items such as "exhibition of fireworks", "back to home town", or "with friends" together with DSC images from the digital still camera 1-2. Therefore, the metadata items such as "exhibition of fireworks", "back to home town", or "with friends" from the camera 1-2 are stored in addition to the existing metadata items (such as "wedding ceremony", "seas", or "pleasant"). As a result, it follows that the camera 1-1 manages an exorbitant number of metadata items as the number of DSC images is increased.

Accordingly, the digital still camera 1-1 offers metadata items that are extracted from the stored DSC images at high frequencies (probabilities), i.e., useful metadata items, from the stored metadata. For example, the camera 1-1 offers only metadata items "seas" and "pleasant" that are highly likely to have been extracted from the DSC images out of the stored metadata items such as "wedding ceremony", "seas", "pleasant", "exhibition of fireworks", "back to home town", or "with friends".

Consequently, even if the number of stored metadata items is increased, only metadata items that are highly likely to have been extracted can be offered. Hence, useful metadata items can be offered to the user.

In the description of the above example, the digital still cameras 1-1 and 1-2 send and receive DSC images by communicating with each other wirelessly. The communication technology is not limited to wireless communications. For example, DSC images may be sent and received by wired communications. DSC images can be exchanged via a recording medium such as a memory card or via a personal computer.

In the following description, if it is not necessary to discriminate between the individual digital still cameras 1-1 and 1-2, they will be simply referred to as the digital still cameras 1.

Figure 2:
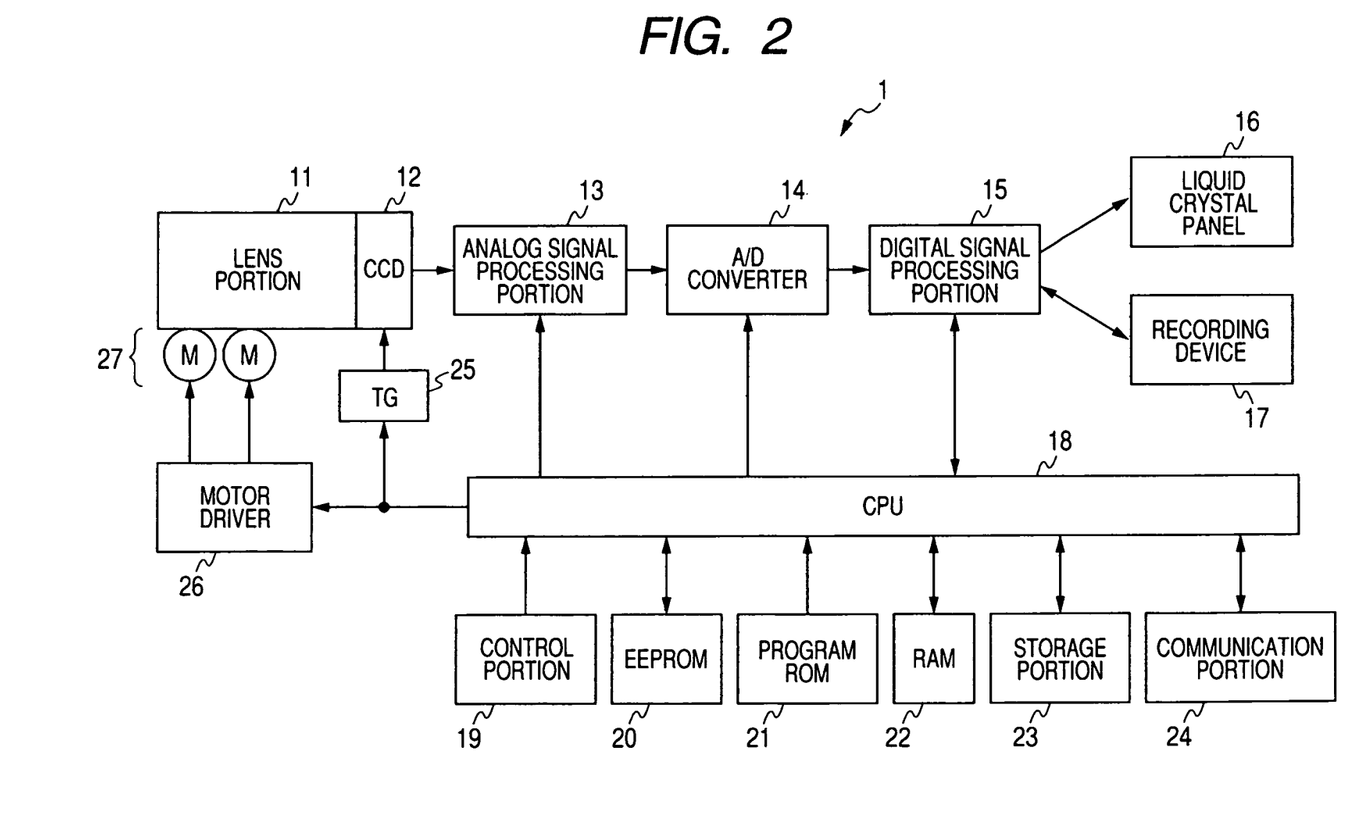
FIG. 2 is a block diagram showing an example of the internal structure of the digital still camera.

FIG. 2 shows an example of internal configuration of the digital still camera 1 shown in FIG. 1. The camera 1 includes a lens portion 11, a CCD (charge coupled device) 12, an analog signal processing portion 13, an A/D (analog/digital) converter portion 14, a digital signal processing portion 15, a liquid crystal panel 16, a recording device 17, a CPU (central processing unit) 18, a control portion 19, an EEPROM (electrically erasable programmable read only memory) 20, a program ROM (read only memory) 21, a RAM (random access memory) 22, a storage portion 23, the communication portion 24, a timing generator (TG) 25, a motor driver 26, and an actuator 27.

The CCD 12 is made of a CCD sensor and operates in response to a timing signal supplied from the timing generator (TG) 25 to thereby receive light from a subject. The light impinges via the lens portion 11. The CCD performs photoelectric conversion and supplies an analog image signal to the analog signal processing portion 13, the analog image signal being an electrical signal responsive to the amount of received light. The CCD 12 however is not limited to a CCD sensor. The CCD 12 may be an imaging device, such as a CMOS (complementary metal oxide semiconductor) sensor for creating an image signal for each individual pixel.

The analog signal processing portion 13 utilizes analog signal processing. That is, the processing portion 13 amplifies the analog image signal from the CCD 12 under control of the CPU 18, and supplies the image signal derived as a result of the analog signal processing to the A/D converter portion 14.

The A/D converter portion 14 converts the analog image signal from the analog signal processing portion 13 into digital form under control of the CPU 18, and supplies the obtained image data represented by a digital signal to the digital signal processing portion 15.

The digital signal processing portion 15 performs digital signal processing (such as processing for noise removal) on the image data from the A/D converter portion 14 under control of the CPU 18, and supplies the data to the liquid crystal panel 16, where the data is displayed. The digital signal processing portion 15 compresses the image data from the A/D converter portion 14, for example, using the JPEG (Joint Photographic Experts Group) format. The resulting compressed image data is supplied to the recording device 17, where the data is recorded. Furthermore, the digital signal processing portion 15 decompresses the compressed image data recorded in the recording device 17 and supplies the resulting image data to the liquid crystal panel 16, where the data is displayed.

The recording device 17 is a semiconductor memory (such as a memory card), DVD (digital versatile disc), or other removable recording medium, and can be easily installed to and removed from the digital still camera 1.

The CPU 18 controls various portions of the digital still camera 1 by executing a program stored in the program ROM 21 and performs various kinds of processing in response to a signal from the control portion 19.

The control portion 19 is manipulated by the user, and supplies a signal responsive to the manipulation to the CPU 18.

Under control of the CPU 18, the EEPROM 20 stores various kinds of information set in the digital still camera 1 and stores other data that may need to be held even when the power supply of the camera 1 is turned off.

The program ROM 21 stores a program executed by the CPU 18 and data necessary for the CPU 18 to execute the program. The RAM 22 temporarily stores program and data which are necessary for the CPU 18 to perform various kinds of processing.

The storage portion 23 and communication portion 24 are connected with the CPU 18. The storage portion 23 is made of a recording medium such as a flash memory or hard disc. The communication portion 24 controls processing for communications with other device, for example, by wireless technology.

The storage portion 23 stores data, for example, regarding metadata attached to DSC (digital still camera) images and data about the DSC images under control of the CPU 18. In the digital still camera 1, various kinds of data which are otherwise stored in the storage portion 23 may be stored in the EEPROM 20 without providing the storage portion 23.

The timing generator 25 supplies the timing signal to the CCD 12 under control of the CPU 18. The exposure time of the CCD 12, i.e., the shutter speed, is controlled by the timing signal supplied to the CCD 12 from the timing generator 25.

The motor driver 26 drives the actuator (motor) 27 under control of the CPU 18. As the actuator 27 is driven, the lens portion 11 is exposed from the enclosure of the digital still camera 1 or received into the enclosure of the camera 1. The aperture forming the lens portion 11 is adjusted, or the focus lens forming the lens portion 11 is moved by driving the actuator 27.

In the digital still camera 1 constructed as described so far, the CCD 12 receives light impinging from the subject via the lens portion 11 and performs photoelectric conversion. The CCD outputs the obtained analog image signal. The analog image signal delivered from the CCD 12 is passed through the analog signal processing portion 13 and the A/D converter portion 14. Consequently, the analog image signal is converted into image data about the digital signal. The digital signal is supplied to the digital signal processing portion 15.

The digital signal processing portion 15 supplies the image data from the A/D converter portion 14 to the liquid crystal panel 16. As a result, a live image is displayed on the liquid crystal panel 16.

Then, when the user manipulates the shutter button (acting as the control portion 19) that is normally manipulated when a captured image is recorded, a signal responsive to the manipulation is supplied from the control portion 19 to the CPU 18. When the signal responsive to the manipulation of the shutter button is supplied from the control portion 19, the CPU 18 controls the digital signal processing portion 15 to compress the image data supplied to the digital signal processing portion 15 from the A/D converter portion 14 at this time. The resulting compressed image data is recorded in the recording device 17.

Photography is performed as described so far.

The program executed by the CPU 18 is previously installed, or stored, in the program ROM 21. Alternatively, the program may be recorded in the recording device 17 and offered as a packaged medium to the user. The program may be stored into the EEPROM 20 from the recording device 17 via the digital signal processing portion 15 and CPU 18. The program can be installed in the digital still camera 1. The program executed by the CPU 18 may be directly downloaded from a download site into the camera 1 of FIG. 2. Alternatively, the program may be downloaded by a computer (not shown), supplied to the camera 1 of FIG. 2, stored in the EEPROM 20, and installed in the camera 1.

The hardware configuration of the digital still camera 1 is not limited to the example of FIG. 2. It may include at least the functional configuration of FIG. 3 (described later).

Figure 3:
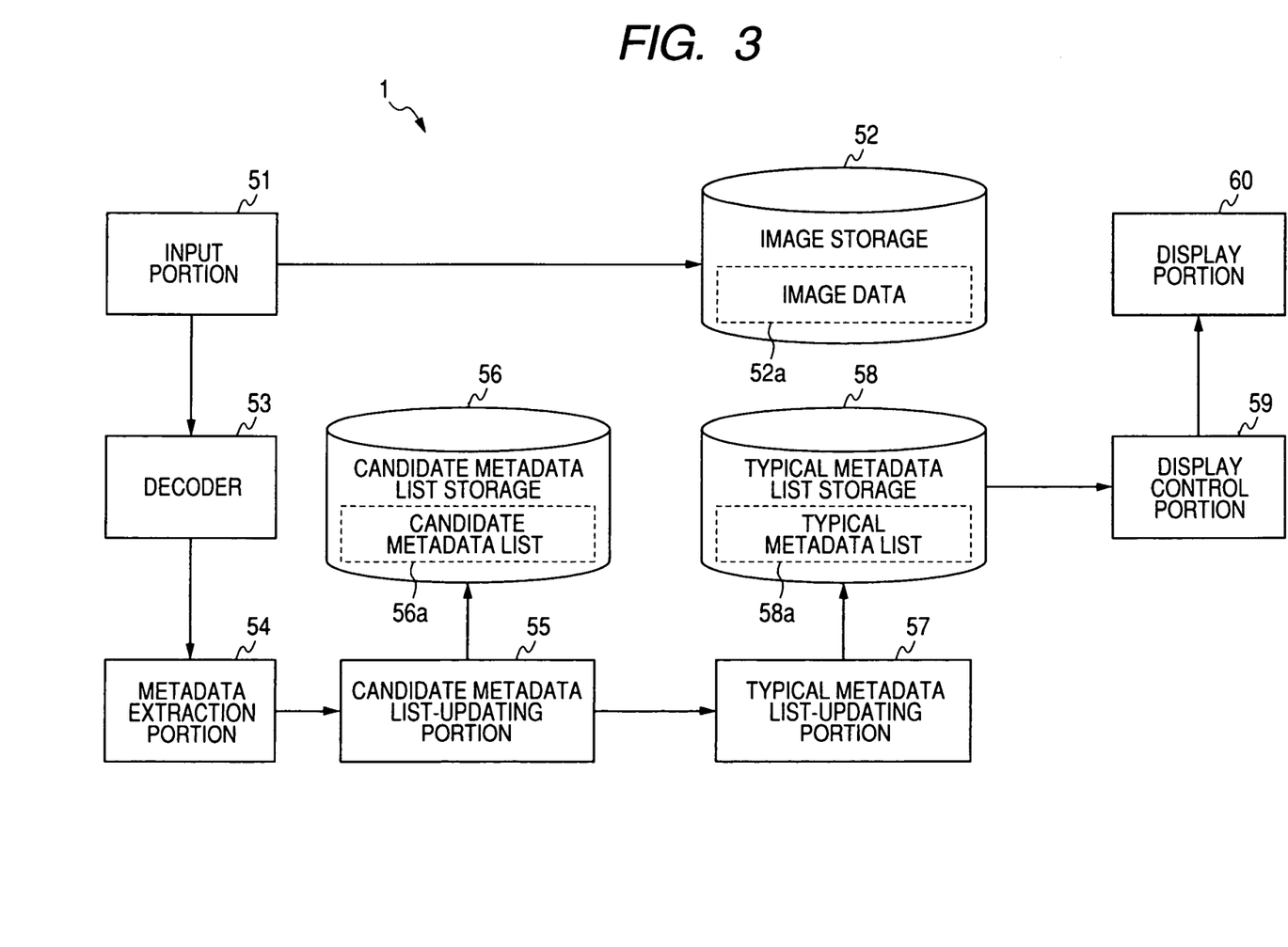
FIG. 3 is a block diagram showing one example of functional configuration of the digital still camera.

FIG. 3 is a block diagram showing an example of the functional configuration of the digital still camera 1 of FIG. 2.

The digital still camera 1 includes an input portion 51, an image storage 52, a decoder 53, a metadata extraction portion 54, a candidate metadata list-updating portion 55, a candidate metadata list storage 56, a typical metadata list-updating portion 57, a typical metadata list storage 58, a display control portion 59, and a display portion 60.

In the present embodiment, the digital still camera 1 has the aforementioned hardware configuration of FIG. 2 and so the decoder 53, metadata extraction portion 54, candidate metadata list-updating portion 55, typical metadata list-updating portion 57, and display control portion 59 are realized, for example, by the CPU 18 of FIG. 2 that executes the software (computer program) recorded in the program ROM 21 of FIG. 2.

For example, the input portion 51 corresponds to the communication portion 24 of FIG. 2. The image storage 52 corresponds to the recording device 17 of FIG. 2. The candidate metadata list storage 56 and the typical metadata list storage 58 correspond to the storage portion 23 of FIG. 2. The display portion 60 corresponds to the liquid crystal panel 16 of FIG. 2.

The decoder 53, metadata extraction portion 54, candidate metadata list-updating portion 55, typical metadata list-updating portion 57 or display control portion 59 can be configured as a hardware unit or as a combination of hardware and software.

In FIG. 3, the squares surrounded by the solid lines indicate blocks acting as constituent elements of an apparatus. The squares surrounded by the broken lines indicate given information. The method of using the solid lines and broken lines separately in this way can be similarly applied to other figures referred to later.

The input portion 51 supplies image data about images, which are entered from other device such as the digital still camera 1-2, to the image storage 52 and to the decoder 53.

In the description of the present embodiment, a DSC image taken by the digital still camera (DSC) 1 is taken as an example of contents entered from other device. The DSC image is not limited to a still image such as an image taken by a camera. The contents may also be a sequence of movie contents or contents to which voice or metadata is attached. Furthermore, in the description of the present embodiment, images indicated by image data entered from those other devices are also referred to as input images.

The image storage 52 stores the image data supplied from the input portion 51. Consequently, in the digital still camera 1-1, for example, image data 52a corresponding to images entered from other device such as the digital still camera 1-2 is stored.

The decoder 53 decodes the image data supplied from the input portion 51. The decoder 53 supplies the image data obtained by the decoding to the metadata extraction portion 54.

The metadata extraction portion 54 extracts metadata about the input image from the image data supplied from the decoder 53. The metadata extraction portion 54 supplies the extracted metadata to the candidate metadata list-updating portion 55.

For example, the metadata extracted by the metadata extraction portion 54 is metadata attached to the input image by the user. For instance, if the input image is a photograph taken when the user went back to his (her) home town and then went to an exhibition of fireworks with his friends, the user attaches items of metadata such as "going back to home town", "with friends", and "exhibition of fireworks" to the input image.

The metadata however is not limited to metadata attached by the user. For example, the metadata may be metadata extracted by performing given image processing, previously attached metadata, or photographical information attached by the functions of the digital still camera 1 such as date, resolution, focus, white balance, or positional information obtained by GPS (global positioning system). In summary, the metadata may be information associated with the input image. Therefore, any arbitrary extraction means or method may be adopted.

The candidate metadata list storage 56 stores the candidate metadata list 56a.

As described in detail later, the candidate metadata list 56a is a list in which candidate metadata becoming candidates for typical metadata extracted at higher frequencies (probabilities) out of the above-described extracted metadata are stored. The candidate metadata and the frequencies (e.g., the number of extractions) at which items of the candidate metadata are extracted are interrelatedly stored in the candidate metadata list 56a.

The candidate metadata list-updating portion 55 updates the candidate metadata list 56a by adding extracted metadata supplied from the metadata extraction portion 54 as candidate metadata to the candidate metadata list 56a.

Where the frequencies of candidate metadata stored in the candidate metadata list 56a are higher than a given frequency, the candidate metadata list-updating portion 55 supplies candidate metadata associated with the frequencies higher than the given frequency to the typical metadata list-updating portion 57.

The typical metadata list storage 58 stores the typical metadata list 58a.

As described in detail later, the typical metadata list 58a is a list in which the typical metadata are stored. The typical metadata and the frequencies (e.g., the number of extractions) at which items of the typical metadata are extracted are interrelatedly stored in the typical metadata list 58a.

The typical metadata list-updating portion 57 adds the candidate metadata supplied from the candidate metadata list-updating portion 55 as typical metadata to the typical metadata list 58a, thus updating the typical metadata list 58a.

That is, the metadata extracted from the image data about the input image is first stored as candidate metadata into the candidate metadata list 56a. Where the frequencies of the candidate metadata stored in the candidate metadata list 56a are higher than a given frequency, the candidate metadata associated with the frequencies are stored as typical metadata into the typical metadata list 58a.

In other words, the candidate metadata stored as the candidate metadata in the candidate metadata list 56a are merely entered as candidates for typical metadata. Then, if candidate metadata stored in the candidate metadata list 56a satisfy given conditions, it can also be said that the candidate metadata are promoted to typical metadata and stored in the typical metadata list 58a.

The display control portion 59 reads the typical metadata list 58a from the typical metadata list storage 58. Information associated with the typical metadata stored in the typical metadata list 58a read out is displayed on the display portion 60 under control of the display control portion 59.

In the example of the structure of FIG. 3, to simplify the explanation, it is assumed that the candidate metadata list 56a is stored in the candidate metadata list storage 56, and that the typical metadata list 58a is stored in the typical metadata list storage 58. The invention however, is not limited to this example. For example, the candidate metadata list 56a and typical metadata list 58a may be stored in any one of the candidate metadata list storage 56 and the typical metadata list storage 58. Furthermore, the candidate metadata list 56a and typical metadata list 58a may be collectively managed as a single list.

The processing is next described in detail below.

Processing performed by the digital still camera 1 (digital still camera 1-1) of FIG. 3 to add metadata is described by referring to the flowchart of FIG. 4.

In response to a control signal supplied from the control portion 19 (e.g., when the user has performed a manipulation to cause the digital still camera 1-1 to wirelessly receive an image stored in the digital still camera 1-2), the CPU 18 causes various parts to execute the processing illustrated in the flowchart of FIG. 4.

In steps S11, the input portion 51 supplies image data corresponding to the input image received from the digital still camera 1-2 to the image storage 52 and to the decoder 53.

In step S12, the image storage 52 stores the image data supplied from the input portion 51. Thus, the digital still camera 1-1 stores the image data 52a corresponding to the input image received from the digital still camera 1-2.

In step S13, the decoder 53 decodes the image data supplied from the input portion 51 and supplies the resulting image data to the metadata extraction portion 54.

In step S14, the metadata extraction portion 54 extracts metadata from the image data supplied from the decoder 53 and supplies the extracted metadata to the candidate metadata list-updating portion 55.

In step S15, the candidate metadata list-updating portion 55 adds the extracted metadata supplied from the metadata extraction portion 54 to the candidate metadata list 56a.

Figure 5:
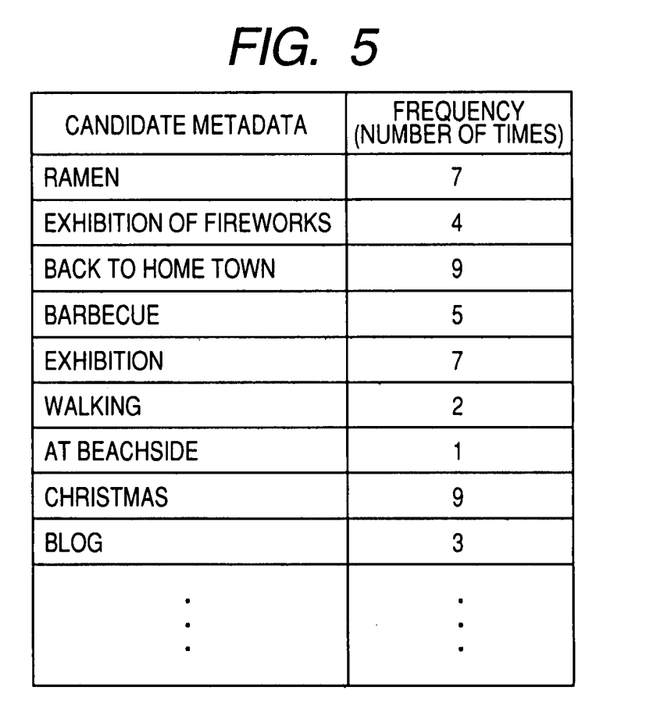
FIG. 5 is a table showing one example of a list of items of candidate metadata.

FIG. 5 shows an example of the candidate metadata list 56a.

In the example of the candidate metadata list 56a shown in FIG. 5, the first column indicates the names of items. The second and following columns indicate information about the items of candidate metadata. The first row indicates "candidate metadata". The second row indicates "frequency". That is, in the candidate metadata list 56a, the frequencies of items of candidate metadata are stored in a corresponding manner to candidate metadata becoming candidates for typical metadata.

For example, in the example of the candidate metadata list 56a shown in FIG. 5, "ramen (quick-cooking egg noodles)" having a frequency (number of times) of 7, "exhibition of fireworks" having a frequency of 4, "back to home town" having a frequency of 9, "barbecue" having a frequency of 5, "exhibition" having a frequency of 7, "walking" having a frequency of 2, "at beachside" having a frequency of 1, "Christmas" having a frequency of 9, "blog" having a frequency of 3, and so on are stored as items of frequency metadata.

In particular, where "exhibition of fireworks", "back to home town", and "with friends" being items of extracted metadata are supplied from the metadata extraction portion 54, the candidate metadata list-updating portion 55 stores these items of extracted metadata into the candidate metadata list 56a. Consequently, in the candidate metadata list 56a, the frequency of the "exhibition of fireworks" is increased by 1 from 4 and reaches 5. The frequency of the "back to home town" is increased by 1 from 9 and reaches 10. "With friends" being an item of extracted metadata not yet stored in the candidate metadata list 56a is newly registered as an item of candidate metadata having a frequency of 1.

Returning to the flowchart of FIG. 4, in step S16, the candidate metadata list-updating portion 55 makes a decision as to whether the frequency of each item of the candidate metadata is higher than a given frequency.

In particular, the candidate metadata list-updating portion 55 makes decisions as to whether the frequencies of the items of the candidate metadata, i.e., "exhibition of fireworks", "back to home town", and "with friends", added to the candidate metadata list 56a are higher than a given frequency, for example, of 10.

If the decision made at step S16 is that the frequency of any item of the candidate metadata is higher than the given frequency, control goes to step S17, where the typical metadata list-updating portion 57 adds the candidate metadata supplied from the candidate metadata list-updating portion 55 to the typical metadata list 58a.

Figure 6:
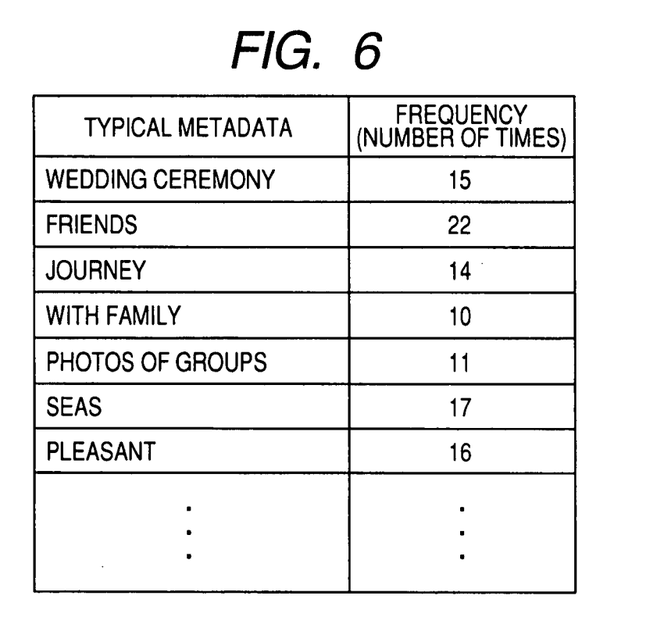
FIG. 6 is a table showing one example of a list of items of candidate metadata.

FIG. 6 shows an example of the typical metadata list 58a.

In the example of the typical metadata list 58a shown in FIG. 6, the first row indicates the names of items. The second and following rows indicate information about items of typical metadata. The first row indicates "typical metadata". The second row indicates "frequency (the number of times)". That is, in the typical metadata list 58a, the frequencies of items of typical metadata are stored in a corresponding manner to the items of the typical metadata.

For example, in the example of the typical metadata list 58a shown in FIG. 6, "wedding ceremony" having a frequency of 15, "friends" having a frequency of 22, "journey" having a frequency of 14, "with family" having a frequency of 10, "photos of groups" having a frequency of 11, "seas" having a frequency of 17, "pleasant" having a frequency of 16, and so on are stored as items of typical metadata.

In particular, where the given frequency is set to 10, for example, the frequency of the item of candidate metadata indicating "back to home town" reaches 10 and exceeds the given frequency. Therefore, the candidate metadata list-updating portion 55 supplies the item of candidate metadata indicating "back to home town" to the typical metadata list-updating portion 57. The typical metadata list-updating portion 57 adds the item of candidate metadata indicating "back to home town" and supplied from the candidate metadata list-updating portion 55 to the typical metadata list 58a. In other words, it can also be said that the item of candidate metadata indicating "back to home town" is promoted to an item of candidate metadata by exceeding the given frequency.

Consequently, in the typical metadata list 58a, the item of typical metadata indicating "back to home town" and having a frequency of 10 is newly stored.

Returning to the flowchart of FIG. 4, in step S18, the candidate metadata list-updating portion 55 deletes the candidate metadata added to the typical metadata list 58a from the candidate metadata list 56a, thus terminating the processing for adding metadata.

In particular, the candidate metadata list-updating portion 55 deletes the item of candidate metadata indicating "back to home town" and stored in the candidate metadata list 56a.

That is, the items of candidate metadata promoted to items of typical metadata are erased from the candidate metadata list 56a.

Meanwhile, if the decision at step S16 is that the frequency of each item of candidate metadata is not higher than the given frequency, the processing of steps S17 and S18 are skipped. The processing for adding metadata is terminated.

In particular, in a case where the given frequency is set to 10, for example, the items of candidate metadata indicating "exhibition of fireworks" and "with friends" are not added to the typical metadata list 58a, but remain in the candidate metadata list 56a because the frequencies of these items of candidate metadata are 5 and 1, respectively. That is, items of candidate metadata having frequencies not exceeding the given frequency are not promoted.

As described so far, in the digital still camera 1, a decision is made as to whether each item of metadata about the image data entered from the outside should be additively registered based on the input frequency of the image data to which the metadata is attached. Only items of metadata satisfying the registration conditions are added to the typical metadata list 58a. Consequently, only items of metadata useful for the user are selected instead of immediately registering every item of metadata into the typical metadata list 58a without checking every item of metadata. Thus, the list is managed. In consequence, the typical metadata list 58a optimized for the user is created.

That is, the candidate metadata stored in the candidate metadata list 56a are merely entered as candidates for typical metadata. In practice, only items of candidate metadata satisfying given criteria are promoted to items of typical metadata and stored in the typical metadata list 58a.

The typical metadata list 58a created in this way is used, for example, when the user is searching DSC images or a keyword (metadata) attached to an image taken by a camera. That is, in the digital still camera 1, when the user performs a manipulation to search DSC images, the display control portion 59 displays the typical metadata stored in the typical metadata list 58a on the display portion 60.

The processing is next described in further detail.

Figure 7:
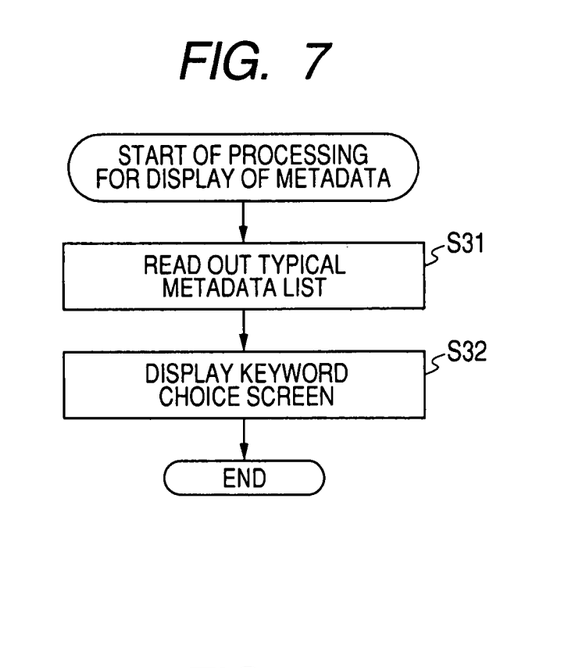
FIG. 7 is a flowchart illustrating processing performed to display metadata.

FIG. 7 is a flowchart illustrating processing performed by the digital still camera 1 (digital still camera 1-1) of FIG. 3 to display the metadata.

The CPU 18 causes various portions to perform the processing illustrated in the flowchart of FIG. 7 in response to a control signal supplied from the control portion 19, for example, when a user has performed a manipulation for searching DSC images or for attaching a keyword to a DSC image.

In step S31, the display control portion 59 reads the typical metadata list 58a from the typical metadata list storage 58.

Figure 8:
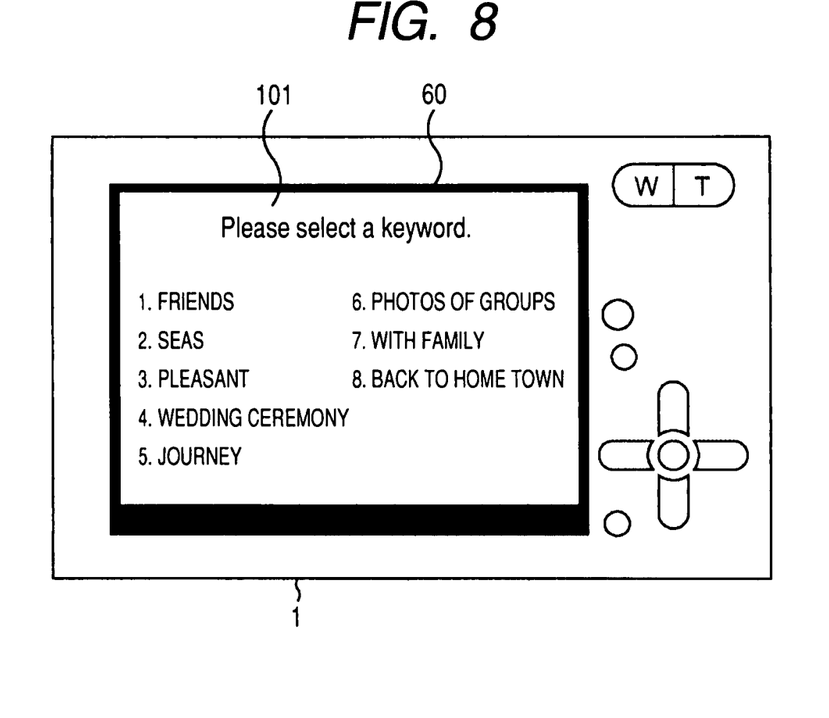
FIG. 8 is a schematic representation showing one example of configuration of a keyword choice screen.

In step S32, the display portion 60 displays a keyword choice screen 101 of FIG. 8, for example, based on the typical metadata list 58a under control of the display control portion 59. Thus, the processing for displaying metadata is terminated.

FIG. 8 shows an example of the keyword choice screen 101.

As shown in FIG. 8, the display portion 60 is mounted on the rear surface of the digital still camera 1. The keyword choice screen 101 is displayed on the display portion 60.

The keyword choice screen 101 is a display screen for displaying keywords (metadata) based on the typical metadata list 58a. As shown in FIG. 8, the items of the typical metadata stored in the typical metadata list 58a shown in FIG. 6 and indicating "wedding ceremony", "friends", "journey", "with family", "photos of groups", "seas", "pleasant", and "back to home town" are displayed in order of decreasing frequency on the keyword choice screen 101. That is, "1. friends", "2. seas", "3. pleasant", "4. wedding ceremony", "5. journey", "6. photos of groups", "7. with family", and "8. back to home town" are displayed in this order. The item of typical metadata indicating "back to home town" is an item of metadata added by the above-described processing illustrated in the flowchart of FIG. 4.

For example, the digital still camera 1 makes the metadata displayed on the keyword choice screen 101 search conditions under which DSC images are searched or attaches the metadata to DSC images in response to a manipulation performed by the user.

In this way, only the typical metadata items promoted from candidate metadata items are displayed on the keyword choice screen 101. Therefore, items of metadata which are used at extreme low possibilities are not displayed. The user can use only useful items of metadata.

For example, "friends", "seas", and "pleasant" being items of typical metadata displayed on the keyword choice screen 101 have frequencies of 22, 17, and 16, respectively. These items of data have three upper numbers of extractions out of the items of metadata extracted from DSC images stored in the digital still camera 1. In other words, it can also be said that a large number of DSC images to which the items of extracted metadata (i.e., "friends", "seas", and "pleasant") having three upper numbers of extractions are attached are stored in the camera 1.

Accordingly, during a search, more DSC images will result in hits by including those items of typical metadata (i.e., "friends", "seas", or "pleasant") in the search criteria. Furthermore, generally, in a case where a keyword (metadata) is attached to each DSC image, it is easier to manage the DSC images if the kinds of attached keywords are reduced. By selecting these items of typical metadata, i.e., "friends", "seas", or "pleasant", and attaching them to DSC images, typical metadata originally attached to many images are attached to the DSC images. Consequently, the DSC images can be managed more easily.

In the digital still camera 1, the resolution on the screen of the display portion 60 is limited structurally. It is difficult to display many items of metadata at a time. Only items of metadata useful for the user can be displayed irrespective of the resolution by reducing the number of items of metadata displayed on the display portion 60.

FIG. 8 is intended to illustrate an example of configuration of the keyword choice screen 101. The layout of the aforementioned various portions are, of course, not limited to the layout shown in FIG. 8. Also, the aspect ratio of the display screen of the display portion 60 is not limited to the aspect ratio shown in FIG. 8.

It is also considered that items of typical metadata stored in the typical metadata list 58a cease to be useful, for example, with elapse of time. An example of operation using a weighing technique is now described. Weights corresponding to elapsed times, for example, from the time of the last update are given to the frequencies of the elements of typical metadata. Values (hereinafter referred to as the evaluation values) obtained thereby are used.

Figure 9:
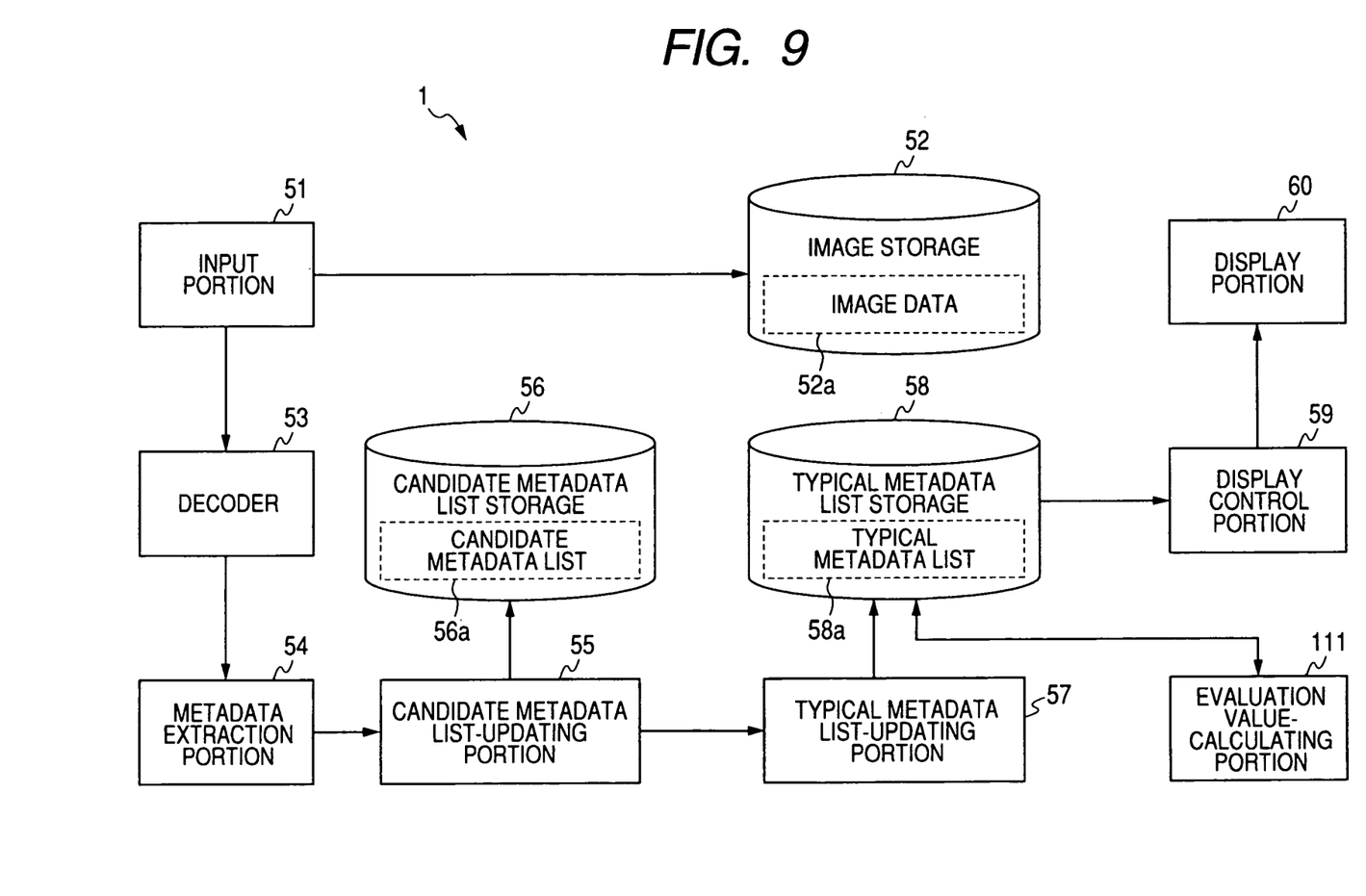
FIG. 9 is a block diagram showing another example of functional configuration of a digital still camera.

FIG. 9 is a block diagram showing other example of the functional configuration of the digital still camera 1.

In FIG. 9, parts similar to their counterparts of FIG. 3 are indicated by the same reference numerals as in FIG. 3 and will not be described below to avoid repeated description. In FIG. 9, the digital still camera 1 is similar to the digital still camera 1 shown in FIG. 3 except that an evaluation value-calculating portion 111 connected with the typical metadata list storage 58 is added.

The evaluation value-calculating portion 111 reads the typical metadata list 58a from the typical metadata list storage 58 and gives weights to the frequencies of the items of typical metadata stored in the typical metadata list 58a. The calculating portion 111 supplies the evaluation values obtained by the weighing to the typical metadata list storage 58.

The typical metadata list storage 58 associates the evaluation values supplied from the evaluation value-calculating portion 111 with the items of typical metadata and stores the values into the typical metadata list 58a.

That is, in the typical metadata list 58a of FIG. 9, at least evaluation values and dates of updates (times elapsed from the final update of the items of the typical metadata) are stored, together with the items of typical metadata and the frequencies at which the items of typical metadata were extracted (e.g., numbers of extractions).

The processing is next described in detail.

FIG. 10 is a flowchart illustrating the processing performed by the digital still camera 1 (digital still camera 1-1) of FIG. 9 to add metadata.

In response to a control signal supplied from the control portion 19 (e.g., when the user has performed a manipulation to cause the digital still camera 11-1 to wirelessly receive an image stored in the digital still camera 1-2), the CPU 18 causes various parts to execute the processing illustrated in the flowchart of FIG. 10.

In steps S51-S57, the metadata extraction portion 54 extracts metadata from the image data about an input image in the same way as the processing of steps S11-S17 of FIG. 4. The candidate metadata list-updating portion 55 adds the extracted metadata to the candidate metadata list 56a. Where the frequencies of the items of the candidate metadata are in excess of a given frequency, the typical metadata list-updating portion 57 adds items of candidate metadata associated with the frequencies to the typical metadata list 58a.

In step S58, the evaluation value-calculating portion 111 calculates the evaluation values for the items of the typical metadata stored in the typical metadata list 58a.

A method of calculating the evaluation values is now described. It is highly likely that the user is interested, for example, in matters related to the DSC images recently stored in the digital still camera 1. Therefore, greater weights are attached to the items of metadata extracted from very recently stored DSC images. Conversely, smaller weights are attached to the items of metadata extracted from DSC images stored from older times. In this way, timewise factors are applied to the above-described frequencies (e.g., the numbers of extractions), and the evaluation values can be found. When these factors are taken into consideration, each evaluation value is expressed, for example, by the following equation.

$$\text{evaluation value(score)} = \text{frequency(number of times)} \times \text{degree of newness} \quad (1)$$

The degree of newness in Eq. (1) can be found, for example, as (365 days−[number of days that are traced back from today])/365 days. For example, typical metadata were added to the typical metadata list 58a today. Because the number of days that are traced back from today providing a basis is 0, the degree of newness of the typical metadata= (365−0)/365=1. If the date is 100 days before, the degree of newness=(365−100)/365≅0.73. If the date is 200 days before, the degree of newness=(365−200)/365≅0.45. If the date is 1 year before, the degree of newness=(365−365)/365=0. That is, as the date goes farther from the date of reference such as 0 day, . . . , 100 days, . . . , 200 days, . . . and 365 days, the degree of newness (0≤degree of newness≤1) decreases in value such as 1, . . . , 0.73, . . . , 0.45, . . . , 0. In this way, timewise weights can be attached to frequencies by multiplying the frequencies by such degrees of newness.

Eq. (1) gives one example of a formula for finding evaluation values. To simplify the illustration, the number of days that can be traced back from the reference date is assumed to be within 1 year. Of course, the number of days that can be traced back may be greater than 1 year. In this case, the degree of newness is set to 0, for example.

Figure 11:
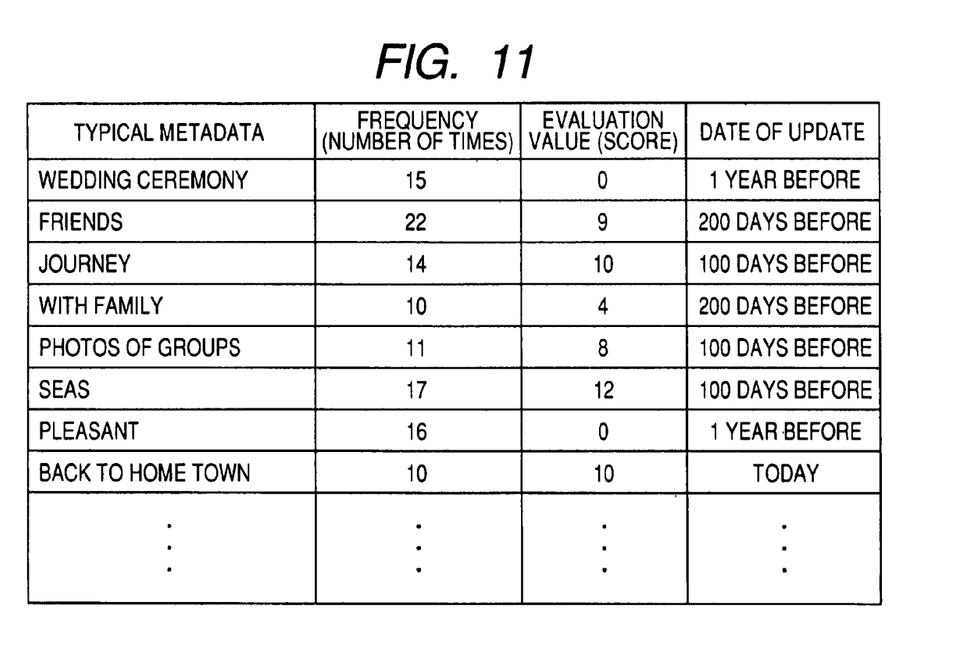
FIG. 11 is a table showing one example of a list of typical metadata.

For example, the evaluation value-calculating portion 111 calculates evaluation values as shown in the typical metadata list 58a of FIG. 11 by applying Eq. (1) to the typical metadata stored in the typical metadata list 58a.

FIG. 11 shows an example of the typical metadata list 58a.

In the example of the typical metadata list 58a shown in FIG. 11, "wedding ceremony" updated the last time 1 year before and having an evaluation value of 0 (15×0=0), "friends" last updated 200 days before and having an evaluation value of 9 (22×0.45≅9), "journey" updated the last time 100 days before and having an evaluation value of 10 (14×0.73≅10), "with family" updated the last time 200 days before and having an evaluation value of 4 (10×0.45≅4), "photos of groups" updated the last time 100 days before and having an evaluation value of 8 (11×0.73≅8), "seas" last updated 100 days before and having an evaluation value of 12 (17×0.73≅12), "pleasant" updated the last time 1 year before and having an evaluation value of 0 (16×0≅0), "back to home town" updated the last time today and having an evaluation value of 10 (10×1=10), and so on are stored as items of typical metadata.

In this way, in the typical metadata list 58a, in a case where only frequencies are compared straightforwardly, "friends" having a frequency of 22, "seas" having a frequency of 17, "pleasant" having a frequency of 16, "wedding ceremony" having a frequency of 15, "journey" having a frequency of 14, "photos of groups" having a frequency of 11, "with family" having a frequency of 10, and "back to home town" having a frequency of 10, have decreasing order of evaluation value in the typical metadata list 58a. However, evaluation values are compared, "seas" having an evaluation value of 12, "journey" having an evaluation value of 10, "back to home town" having an evaluation value of 10, "friends" having an evaluation value of 9, "photos of groups" having an evaluation value of 8, "with family" having an evaluation value of 4, "wedding ceremony" having an evaluation value of 0, and "pleasant" having an evaluation value of 0, have decreasing order of evaluation value.

Consequently, for example, the item of typical metadata indicating "back to home town" and added today is increased in evaluation value. Meanwhile, the items of typical metadata indicating "wedding ceremony" and "pleasant" which have not been added for more than 1 year are reduced in evaluation value. As a result, the items of typical metadata that are more useful for the user can be increased in evaluation value and the items of typical metadata that are less important can be reduced in evaluation value.

Returning to the flowchart of FIG. 10, in step S59, the candidate metadata list-updating portion 55 deletes unwanted items of candidate metadata from the candidate metadata list 56a in the same way as in the processing of step S18 of FIG. 4. The processing for adding metadata is terminated.

As described so far, in the digital still camera 1, the evaluation values of items of typical metadata stored in the typical metadata list 58a can be found, the evaluation values be interrelated to the items of the typical metadata, and be stored.

Then, in the digital still camera 1, the display control portion 59 displays the keyword choice screen on the display portion 60, for example, by executing the above-described processing of the flowchart of FIG. 7, the screen being based on the typical metadata list 58a of FIG. 11 in which evaluation values are stored. At this time, on the keyword choice screen, items of typical metadata are displayed not in order of decreasing frequency as in FIG. 8, but in order of decreasing evaluation value, e.g., "1. seas", "2. journey", "3. back to home town", "4. friends", "5. photos of groups", "6. with friends", "7. wedding ceremony", and "8. pleasant".

Consequently, the user can perform searches or attach keywords to DSC images by making use of more useful items of typical metadata.

In the description of the above examples, the evaluation values of items of typical metadata stored in the typical metadata list 58a are found. Instead, the evaluation values of the items of candidate metadata stored in the candidate metadata list 56a may be found.

In this case, the evaluation value-calculating portion 111 applies, for example, Eq. (1) to the items of candidate metadata list 56a stored in the candidate metadata list storage 56 to thereby calculate evaluation values as shown in the candidate metadata list 56a of FIG. 12.

Figure 12:
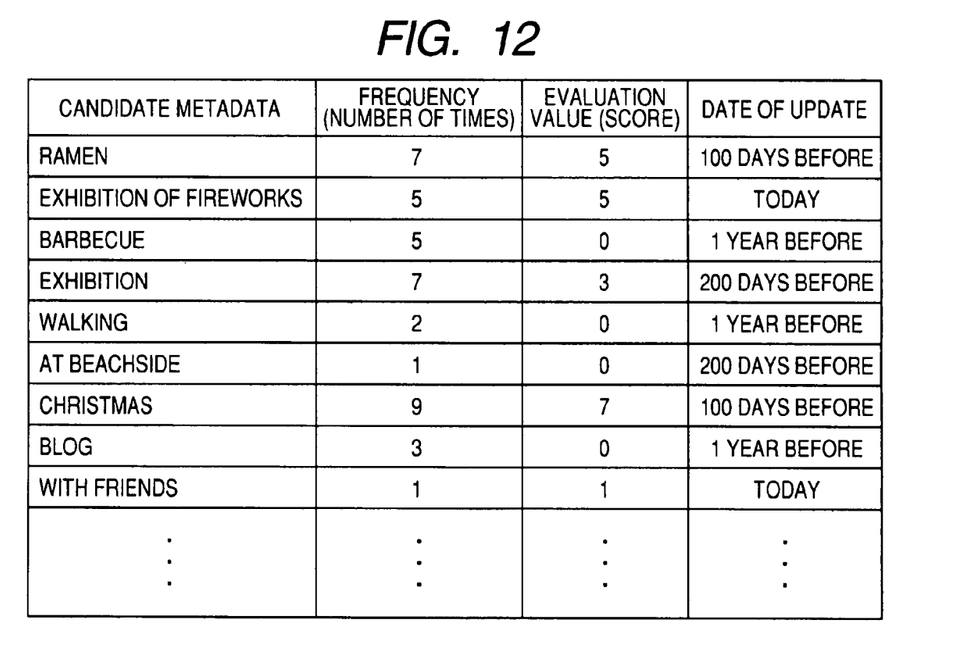
FIG. 12 is a table showing one example of a list of candidate metadata.

FIG. 12 shows an example of the candidate metadata list 56a.

In the example of the candidate metadata list 56a shown in FIG. 12, the stored items of the candidate metadata are: "ramen" last updated 100 days before and having an evaluation value of 5 (7×0.73≅5), "exhibition of fireworks" updated today and having an evaluation value of 5 (5×1=5), "barbecue" updated the last time 1 year before and having an evaluation value of 0 (5×0=0), "exhibition" last updated 200 days before and having an evaluation value of 3 (7×0.45≅3), "walking" last updated 1 year before and having an evaluation value of 0 (2×0=0), "at beachside" last updated 200 days before and having an evaluation value of 0 (1×0.45≅0), "Christmas" last updated 100 days before and having an evaluation value of 7 (9×0.73≅7), "blog" last updated 1 year before and having an evaluation value of 0 (3×0=0), "with friends" last updated today and having an evaluation value of 1 (1×1=1), and others.

In this way, in the candidate metadata list 56a, in a case where only frequencies are compared simply, "Christmas" having a frequency of 9, "ramen" having a frequency of 7, "exhibition" having a frequency of 7, "exhibition of fireworks" having a frequency of 5, "barbecue" having a frequency of 5, "blog" having a frequency of 3, "walking" having a frequency of 2, "at beachside" having a frequency of 1, and "with friends" having a frequency of 1, are arranged in order of decreasing frequency. However, where evaluation values are compared, "Christmas" having an evaluation value of 7, "ramen" having an evaluation value of 5, "exhibition of fireworks" having an evaluation value of 5, "exhibition" having an evaluation value of 3, "with friends" having an evaluation value of 1, "barbecue" having an evaluation value of 0, "walking" having an evaluation value of 0, "at beachside" having an evaluation value of 0, and "blog" having an evaluation value of 0, are arranged in order of decreasing evaluation value.

Consequently, for example, the items of candidate metadata indicating "exhibition of fireworks" and "with friends", respectively, and added today are increased in evaluation value. Meanwhile, the items of candidate metadata indicating "barbecue", "walking", and "blog", respectively, which have not been added for more than 1 year are reduced in evaluation value. For example, the candidate metadata list-updating portion 55 compares the evaluation value of each item of the candidate metadata with a given evaluation value. If the result of the decision is that the evaluation value of any item of candidate metadata exceeds the given evaluation value, the item of candidate metadata is supplied to the typical metadata list-updating portion 57 in order to promote the item of candidate metadata associated with the evaluation value to an item of typical metadata.

Consequently, items of candidate metadata that are more useful to the user can be promoted to items of typical metadata.

In the above examples, weights corresponding to dates of updates are assigned to frequencies, and evaluation values are computed. The method of calculating the evaluation values, however, is not limited to this. For example, weighing may be done according to information about the user's taste or kinds of DSC images. For instance, DSC images taken by the user himself may be set higher in evaluation value than DSC images received from other users.

As described so far, a total on the items of candidate metadata stored in the candidate metadata list 56a is calculated. Only items of candidate metadata giving greater than a given number are promoted to items of typical metadata and stored in the typical metadata list 58a. Consequently, a list of metadata in which useful items of metadata are stored can be created. As a result, in the digital still camera 1, only items of metadata used at high frequencies (probabilities) can be selected and displayed using the typical metadata list 58a created in this way.

In the present embodiment, the digital still camera 1 is explained as one example of an information processor. The information processor is not limited to such a digital still camera. For example, the information processor may be a mobile music player capable of reproducing music contents, personal computer, video camera, cell phone, or any other device capable of storing contents.

Furthermore, metadata extracted from image data about an input image are extracted by the metadata extraction portion 54. Besides, items of metadata (extracted metadata) themselves corresponding to the input image may be given from an external device.

Moreover, in the above description of the present embodiment, items of candidate metadata satisfying given conditions are promoted to items of typical metadata and stored in the typical metadata list 58a. Conversely, items of typical metadata satisfying certain conditions may be demoted to items of candidate metadata and stored in the candidate metadata list 56a.

The aforementioned sequence of operations may be carried out by hardware or by software. When the sequence of operations is performed by software, a program forming the software is installed from a recording medium into a computer having a built-in dedicated hardware unit or into, for example, a general-purpose personal computer which can execute various functions by installing various programs.

The recording medium is made of the recording device 17 of FIG. 2, the device 17 being made of a magnetic disc (including a flexible disc) on which a program is recorded, an optical disc (including a CD-ROM (compact disc-read only memory) and a DVD), a magnetooptical disc (including MD (Mini-Disc®), or a semiconductor memory distributed to offer a program to the user, apart from the computer. The recording medium is made of the program ROM 21 of FIG. 2 on which programs are recorded. The program ROM is previously built in the computer, and this computer is offered to the user.

The program for executing the aforementioned sequence of operations may be installed into a computer via an interface, such as a router or modem as the need arises, or via a wired or wireless communication medium, such as a local area network (LAN), the Internet, or a digital satellite broadcast.

In the present specification, the processing steps setting forth a program stored in a recording medium can, of course, be carried out in the described time sequential order. The steps are not always required to be carried out in a time sequential order. The processing steps may be carried out in a parallel manner or separately.

It is to be understood that the present invention is not limited to the above-described embodiments and that various changes and modifications are possible without departing from the gist of the present invention.

What is claimed is:

1. An information processing method, comprising:
   extracting, by a computing system, a set of metadata from contents;
   updating, by the computing system, a candidate metadata list by interrelating the metadata of the set to generate a candidate metadata for each metadata group identified from the interrelation, generating an extraction frequency value for each candidate metadata, and adding each candidate metadata and the extraction frequency value corresponding to that candidate metadata to the candidate metadata list;
   comparing, by the computing system, the extraction frequency value of each candidate metadata on the candidate metadata list to a threshold value;
   updating, by the computing system, a typical metadata list by promoting from the candidate metadata list each candidate metadata whose extraction frequency value is greater than the threshold value as typical metadata to the typical metadata; and
   deleting, by the computing system, each candidate metadata whose extraction frequency value is greater than the threshold value from the candidate metadata list after promotion to the typical metadata list,
   wherein the typical metadata list respectively associates each typical metadata with the extraction frequency value corresponding to the promoted candidate metadata.

2. The information processing method of claim 1, further comprising:
   assigning, by the computing system, weights to the extraction frequency values of the typical metadata list based on multiplying the extraction frequency values by degrees of newness.

3. The information processing method of claim 2, wherein the degree of newness is calculated by:

$$X=(365-Y)/365,$$

where X is the degree of newness and Y is a number of days between a date of the typical metadata and a present day.

4. The information processing method of claim 1, wherein the contents are images taken by a camera.

5. The information processing method of claim 1, wherein the extracted metadata is information attached to the contents by the computing system.

6. A computer program product stored on a non-transitory computer readable medium that when executed by a computer performs a method for information processing, the method comprising:
   extracting, by the computer, a set of metadata from contents;
   updating, by the computer, a candidate metadata list by interrelating the metadata of the set to generate a candidate metadata for each metadata group identified from the interrelation, generating an extraction frequency value for each candidate metadata, and adding each candidate metadata and the extraction frequency value corresponding to that candidate metadata to the candidate metadata list;
   comparing, by the computer, the extraction frequency value of each candidate metadata on the candidate metadata list to a threshold value;
   updating, by the computer, a typical metadata list by promoting from the candidate metadata list each candidate metadata whose extraction frequency value is greater than the threshold value as typical metadata to the typical metadata; and
   deleting, by the computer, each candidate metadata whose extraction frequency value is greater than the threshold value from the candidate metadata list after promotion to the typical metadata list,
   wherein the typical metadata list respectively associates each typical metadata with the extraction frequency value corresponding to the promoted candidate metadata.

7. The computer program product of claim 6, further comprising:
   assigning, by the computer, weights to the extraction frequency values of the typical metadata list based on multiplying the extraction frequency values by degrees of newness.

8. The computer program product of claim 7, wherein the degree of newness is calculated by:

$$X=(365-Y)/365,$$

where X is the degree of newness and Y is a number of days between a date of the typical metadata and a present day.

9. The computer program product of claim 6, wherein the contents are images taken by a camera.

10. The computer program product of claim 6, wherein the extracted metadata is information attached to the contents by the computer.

11. An information processing apparatus, comprising:
   a non-transitory computer readable medium that stores information processing instructions; and
   a processor that when executing the information processing instruction performs the operations of:
      extracting a set of metadata from contents;
      updating a candidate metadata list by interrelating the metadata of the set to generate a candidate metadata for each metadata group identified from the interrelation, generating an extraction frequency value for each candidate metadata, and adding each candidate metadata and the extraction frequency value corresponding to that candidate metadata to the candidate metadata list;
      comparing the extraction frequency value of each candidate metadata on the candidate metadata list to a threshold value;
      updating a typical metadata list by promoting from the candidate metadata list each candidate metadata whose extraction frequency value is greater than the threshold value as typical metadata to the typical metadata; and
      deleting each candidate metadata whose extraction frequency value is greater than the threshold value from the candidate metadata list after promotion to the typical metadata list,
   wherein the typical metadata list respectively associates each typical metadata with the extraction frequency value corresponding to the promoted candidate metadata.

12. The information processing apparatus of claim 11, wherein the processor further performs the operation of assigning weights to the extraction frequency values of the typical metadata list based on multiplying the extraction frequency values by degrees of newness.

13. The information processing apparatus of claim 12, wherein the degree of newness is calculated by:

$$X=(365-Y)/365,$$

where X is the degree of newness and Y is a number of days between a date of the typical metadata and a present day.

14. The information processing apparatus of claim 11, wherein the contents are images taken by a camera.

15. The information processing apparatus of claim 11, wherein the extracted metadata is information attached to the contents corresponding to the promoted candidate metadata.

* * * * *